(12) United States Patent
Simpson et al.

(10) Patent No.: US 7,954,135 B2
(45) Date of Patent: May 31, 2011

(54) TECHNIQUES FOR PROJECT LIFECYCLE STAGED-BASED ACCESS CONTROL

(75) Inventors: Michel Shane Simpson, American Fork, UT (US); Volker Gunnar Scheuber-Heinz, Pleasant Grove, UT (US); Lee Edward Lowry, Orem, UT (US); William Street, Orem, UT (US)

(73) Assignee: Novell, Inc., Provo, UT (US)

( * ) Notice: Subject to any disclaimer, the term of this patent is extended or adjusted under 35 U.S.C. 154(b) by 932 days.

(21) Appl. No.: 11/765,482

(22) Filed: Jun. 20, 2007

(65) Prior Publication Data
US 2008/0319999 A1 Dec. 25, 2008

(51) Int. Cl.
*G06F 17/00* (2006.01)
*G06F 7/04* (2006.01)
*G06F 15/16* (2006.01)
*G06F 17/30* (2006.01)
*H04L 29/06* (2006.01)
*G06F 15/173* (2006.01)

(52) U.S. Cl. .................. 726/1; 726/4; 726/21; 709/204; 709/219; 709/223

(58) Field of Classification Search ........................ None
See application file for complete search history.

(56) References Cited

U.S. PATENT DOCUMENTS

| | | | |
|---|---|---|---|
| 6,061,726 A * | 5/2000 | Cook et al. ..................... 709/226 |
| 6,192,405 B1 * | 2/2001 | Bunnell ......................... 709/225 |
| 7,143,136 B1 * | 11/2006 | Drenan et al. ................. 709/204 |
| 7,167,983 B1 | 1/2007 | Tiller et al. |
| 7,305,392 B1 * | 12/2007 | Abrams et al. ................ 707/770 |
| 7,647,318 B1 * | 1/2010 | Enns et al. ............. 707/999.006 |
| 2004/0093397 A1 * | 5/2004 | Chiroglazov et al. ......... 709/219 |
| 2005/0216956 A1 * | 9/2005 | Orr et al. .......................... 726/23 |
| 2005/0262148 A1 | 11/2005 | Davitt |
| 2005/0273619 A1 * | 12/2005 | Guo et al. ...................... 713/182 |
| 2006/0047811 A1 | 3/2006 | Lau et al. |
| 2006/0212714 A1 | 9/2006 | Ting et al. |
| 2007/0129976 A1 | 6/2007 | Hochberg et al. |
| 2008/0027775 A1 * | 1/2008 | Ellis et al. .......................... 705/8 |
| 2008/0127135 A1 * | 5/2008 | Bergstrom et al. ............ 717/140 |
| 2008/0134298 A1 * | 6/2008 | Nathan et al. ...................... 726/4 |

\* cited by examiner

*Primary Examiner* — Shin-Hon Chen
(74) *Attorney, Agent, or Firm* — Schwegman, Lundberg & Woessner, P.A.

(57) ABSTRACT

Techniques for project lifecycle staged-based access control are provided. Access control rights are defined for a stage of a project's lifecycle. As requestors transition to the stage, the access control rights are enforced on top of any existing security restrictions. In an embodiment, selective resources are not visible to requesters within the stage in response to the access control rights.

24 Claims, 3 Drawing Sheets

FIG. 4

TECHNIQUES FOR PROJECT LIFECYCLE STAGED-BASED ACCESS CONTROL

FIELD

The invention relates generally to security and more particularly to techniques for project lifecycle staged-based access control.

BACKGROUND

Increasingly enterprises and governments are turning to technology to automate and streamline their internal operations and business processes. Furthermore, the advent of the Internet and the World-Wide Web (WWW) has allowed enterprises and governments to delivery goods and services in an automated and nearly instantaneous fashion across the entire globe.

With any good or service provided by an enterprise or a government, there can be potentially a myriad of activities and expenses associated with those activities, which the enterprise or government endures before the good or service is available in the marketplace for consumption.

For example, word processing software has to be initially defined, developed and tested before it can be released for sale. These activities are usually managed internally by high-salaried project managers. For the most part, the project managers are administrators with skill in acquiring other personnel and equipment within an enterprise to make a project move from conception and development to release. In some cases, projects are so large within an enterprise that multiple layers of project managers are needed for any given project.

In large part, the industry has not been able to successfully automate and streamline the project management process. As a result, the cost of goods and services are likely unduly inflated and the time-to-market for goods and services is longer than it probably should be.

One reason for this lack of automation is the perceived complexity associated with project management in general. There are a variety of considerations such as laws, regulations, internal procedures that have to be followed. In addition, there may be limited personnel with specific skill sets some of which may be in high demand and unavailable within the enterprise and some of which the enterprise does not have and will have to contract out or hire in order to obtain.

Moreover, and perhaps the most insurmountable problem, is that there has to be an infrastructure of equipment and software systems to support product development for the project. In this case, an enterprise hires or maintains large support staffs to arrange, operate, and maintain the infrastructure. This staff may not even be related in any manner to the product being developed but this staff is indispensable to the success of the project. Additionally, the various software systems and computers used for the infrastructure have to be compatible and in many cases duplicated for different phases of the project (e.g., development versus quality assurance, etc.). This separation of environments within the infrastructure is crucial to the overall process and in some cases may be mandated. However, it also creates a lot of excess capacity and duplication between the phases in terms of equipment, software systems, and support staff.

Another issue that has to be addressed with multiple project environments entails security access. That is, responsibilities for different parts of a project's environment are often split between different personnel or groups within an enterprise. So, the development environment is often owned by engineering, the testing environment by testers, and the staging and production by operations. Thus, in addition to administration and maintenance, security procedures and policies often have to be enforced within each particular portion of a project's infrastructure.

Furthermore, each environment typically has its own security mechanism, such that a project's integrity can be altered by personnel having proper security within a particular environment and even when policy of the overall project would prohibit such a scenario. Thus, security tends to be enforced based on the project's environment and not based on particular points associated with a project's lifecycle.

Thus, what is needed is a mechanism, which allows for improved and automated project lifecycle stage-based access control.

SUMMARY

In various embodiments, techniques for project lifecycle staged-based access control are provided. More specifically, and in an embodiment, a method is provided for project lifecycle staged-based access control. Access control rights are acquired for a first stage of a first processing environment. The first stage is one of a plurality of other stages associated with a lifecycle of a project. The access control rights are enforced against requesting resources that access the first processing environment in response to identities associated with the requesting resources and policies associated with the identities that map to portions of the access control rights. The access control rights are additional security limitations layered on top of and in addition to existing security limitations for the first processing environment.

DETAILED DESCRIPTION

A "resource" includes a user, content, a processing device, a node, a service, an application, a system, a schema definition, a directory, an operating system (OS), a file system, a data store, a database, a policy definition, a configuration definition, a file, a World-Wide Web (WWW) service, a WWW page, groups of users, combinations of these things, etc. The terms "service," "application," and "system" may be used interchangeably herein and refer to a type of software resource that includes instructions, which when executed by a machine performs operations that change the state of the machine and that may produce output.

In an embodiment, each resource is electronically defined and represented as having one or more attributes. Each attribute includes one or more name value pairs. For example, a server resource may include an attribute associated with its physical Internet Protocol (IP) address and that attribute may be represented by the following name value pair: "IP=100.1.1.10." The server resource may also have its own identity (discussed below) and may include other attributes such as whether the IP address is static or dynamic, etc. Attributes may also include references to policy or even specific configuration details for a given processing environment that a resource is to be deployed to.

In some cases, when a resource is a service, the resource may include attributes that identify particular functions, operations, features, etc. For example, a calculator resource can have functions or operations that identify addition, subtraction, multiplication, division, etc.

A "project" refers to the activity associated with an enterprise or government producing a good (product) or personal service (e.g., financial advice, etc.) for consumption in the marketplace. The activity for the project is defined in various stages of the project's lifecycle, such as by way of example only project definition, project development, project testing, project release, etc. Thus, a "project" is represented and electronically defined as a series of stages associated with the project's lifecycle. Each stage includes its own processing environment having its own or shared resources. So, a stage is represented and electronically defined as one or more resources and their relationships with other resources of the same stage or a different stage. A project may also be viewed as a type of resource.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. A single processing environment may be logically defined, such that it spans multiple different networks (e.g., multiple different LAN's, a LAN and a wide-area network (WAN), etc.).

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

The phrase "access control rights" refer to access permissions for one aspect of one resource with respect to another resource. So, an access control right may identify read access for a user (one resource) to access a file (another resource). The access control rights may also be associated with groups or resources or resources assigned to specific roles. So, a user associated with an administrator role may be given access control rights based on the role assigned to the user.

As used herein "policies" are used to define the access control rights. So, a policy can include one or more conditional expressions that when evaluated to true are associated with a particular access control right to another resource. Policies can be nested and hierarchical. Additionally, policies can be global (coarse grain) or local (fine grain).

Various embodiments of this invention can be implemented in existing network architectures, security systems, data centers, and/or communication devices. Any particular architectural layout or implementation presented herein is provided for purposes of illustration and comprehension only and is not intended to limit aspects or embodiments of the invention.

It is within this context, that various embodiments of the invention are now presented with reference to the FIGS. 1-4.

Figure 1:
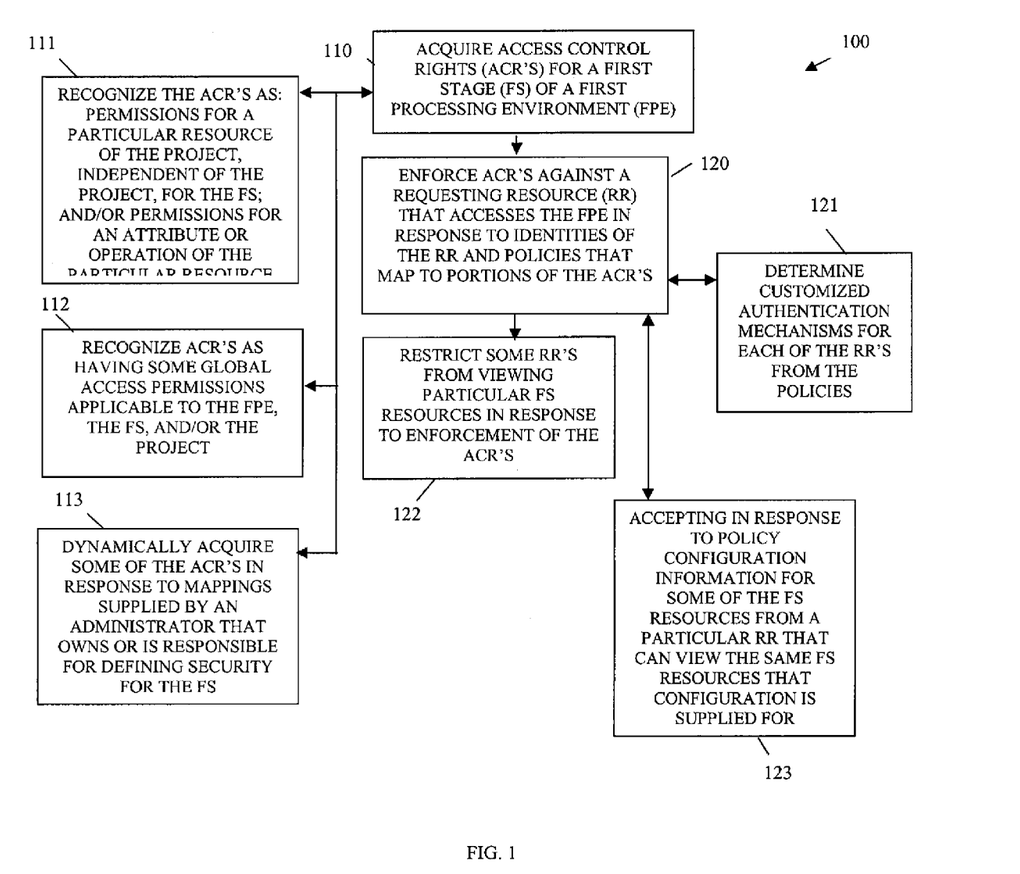
FIG. 1 is a diagram of a method for staged-based access control, according to an example embodiment.

FIG. 1 is a diagram of a method 100 for staged-based access control, according to an example embodiment. The method 100 (hereinafter "staged-based access control service") is implemented as instructions in a machine-accessible and readable medium. The instructions when executed by a machine perform the processing depicted in FIG. 1. The staged-based access control service is also operational over and processes within a network. The network may be wired, wireless, or a combination of wired and wireless.

As will be more fully described herein and below, the staged-based access control service permits an additional layer of security to be defined and enforced on resources and environments based on a particular stage of a project's lifecycle. Each stage includes its own set of resources and, perhaps, its own processing environment. The resources are dynamically configured, transitioned, and managed within each stage and between the various stages of the lifecycle.

The staged-based access control service is invoked for processing when defining staged-based access control for a particular stage or when a requesting resource transitions to a particular stage having the staged-based access control service and under staged-based access control.

At 110, the staged-based access control service acquires access control rights for a first stage of a first processing environment. The first stage is one of a plurality of stages associated with a lifecycle of a project. The first processing environment includes a variety of first resources. The first processing environment does not have to be exclusively reserved for the first stage although it can be. Similarly, the first resources do not have to be exclusively reserved for the first stage although they can be.

According to an embodiment, at 111, the staged-based access control service recognizes the access control rights as being security permissions for a particular resource of a project. Additionally, the staged-based access control service can recognize the access control rights as being independent of any particular project. Still further, the staged-based access control service can recognize the access control rights as being associated with the first resources. The access control rights may also be associated with an attribute of a particular first resource or an operation of a particular first resource. So, the access control rights can be recognized as being coarse grain in nature (for the project or processing environment) or fine grain in nature (for an attribute or operation of a particular resource).

In another case, at 112, the staged-based access control service recognizes the access control rights as being globally associated with the first processing environment, the first stage, and/or the project.

In still another situation, at 113, the staged-based access control service dynamically acquires some of the access control rights in response to mappings supplied by an administrator. The administrator owns or is responsible for the security associated with the first stage. In some cases, the administrator may have initially defined the first stage and supplied mappings to subsequent stages for the first resources to transition to and supplied mappings from other stages that transition to the first stage. During the mapping phase, the administrator may also actively supply and define security by way of the defining and assigning the access control rights for the first stage.

At 120, the staged-based access control service dynamically and in real time enforces the access control rights against a requesting resource that accesses the first processing environment. In other words, the requesting resource transitions from another stage into the first stage and is authenticated to the first stage. An identity associated with the requesting resource is used to acquire and identify the proper access control rights. Policies are then acquired that are associated with or that define the access control rights. These policies are then dynamically and in real time enforced against the requesting resource within the first processing environment and for the first stage. The policies map to portions of the access control rights. So each access control right can have one or more policies that define the access control right.

In an embodiment, at 121, the staged-based access control service determines customized authentication for each requesting resource that transitions to the first stage and the first processing environment. That is, the access control rights may include policies that define how a particular requesting resource is to authenticate for initial access to the first stage and the first processing environment.

In another case, at 122, the staged-based access control service may dynamically restrict some of the requesting resources from viewing particular ones of the first stage resources in response to enforcement of the access control rights and their policies. That is, some first stage resources may not even be viewable or discoverable by particular requesting resources, when the access control rights and policies prohibit those first stage resources from being viewed based on the identity of the particular requesting resources.

However, at 123, the staged-based access control service can accept some configuration information associated with some first stage resources in response to policy and access control rights. Thus, even if a particular requesting resource cannot view a particular first stage resource that particular requesting resource may still be able pursuant to access control rights to submit first stage configuration information to the staged-based access control service for the particular first stage resource that is not viewable. This may be useful when a requesting resource is unauthorized or needs approval too initiate a particular first stage resource, such as a server in the first processing environment. So, the requesting resource can supply the configuration information but may have to wait on another resource to manually authorize or install the configuration settings.

The first stage can be an initial stage or can be a latter stage in a project's lifecycle. The adjective "first" is not meant to imply a particular order. The adjective is used to illustrate that a particular stage of lifecycle for a project can have stage-based access control used and enforced in a dynamic fashion as other resources transition into it.

It is also noted that the staged-based access control service and the access control rights are enforced on top of and in addition to other security restrictions that may be associated with the first stage resources and/or the first processing environment. So, the processing of the staged-based access control service is in addition and layered on top of existing security that exists for the resources and the environment. In some cases, policy may also supersede existing security; such that the access control rights override existing security restrictions.

One now appreciates how customized staged-based access control is achieved for stages of a project's lifecycle. The access control is in addition to normal security and can be coarse grain or fine grain in nature.

Figure 2:
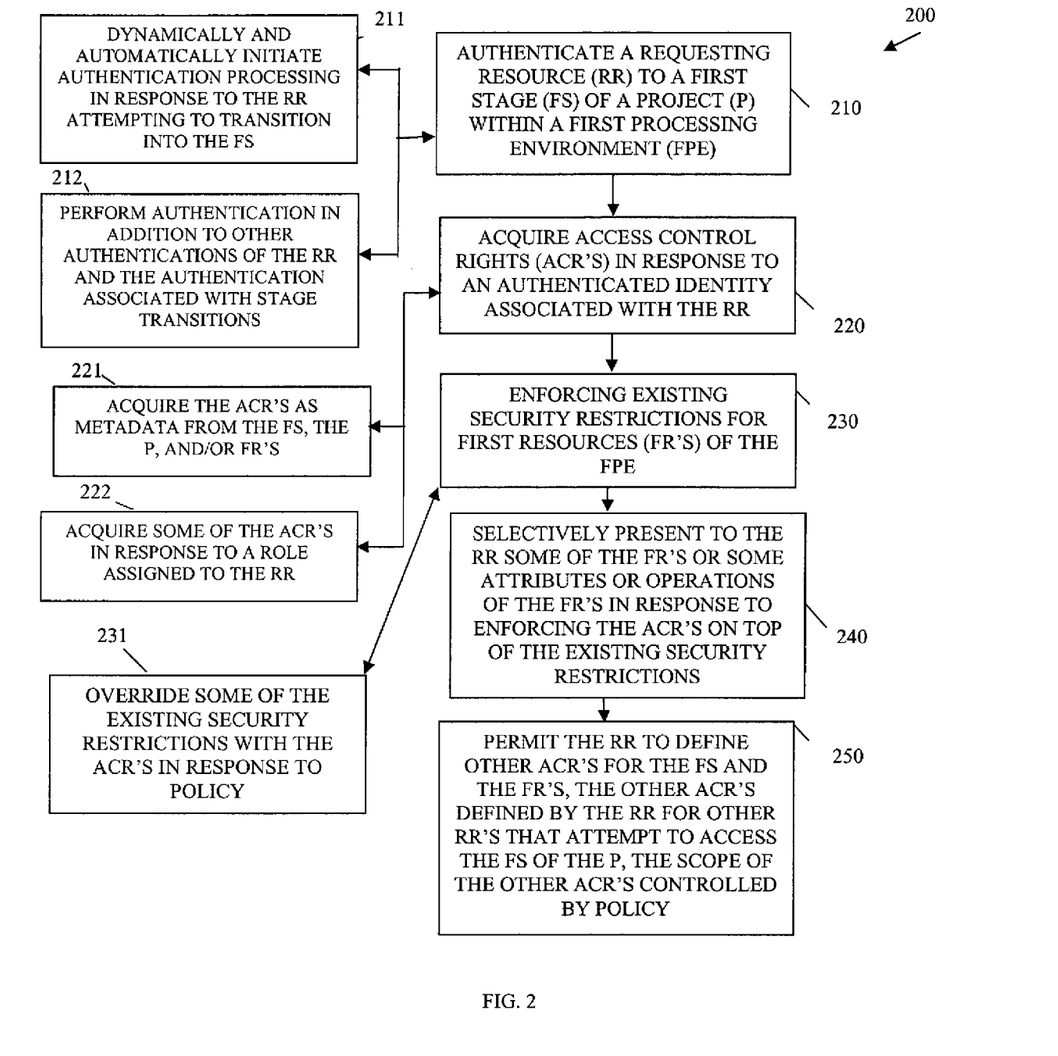
FIG. 2 is a diagram of another method for staged-based access control, according to an example embodiment.

FIG. 2 is a diagram of another method 200 for staged-based access control, according to an example embodiment. The method 200 (hereinafter "project-access control service") is implemented as instructions in a machine-accessible and readable medium. The instructions when executed by a machine perform the processing depicted in FIG. 2. The project-access control service is also operational over and processes within a network. The network may be wired, wireless, or a combination of wired and wireless.

The project-access control service represents processing associated with staged-based access control for a particular project. Moreover, the project-access control service represents an alternative and in some cases enhanced perspective of the staged-based access control service represented by the method 100 of the FIG. 1.

At 210, the project-access control service authenticates a requesting resource to a first stage of a project. The project is defined by a plurality of stages. The first stages may be an initial, middle, or last stage of the lifecycle and the adjective "first" is used for purposes of illustration only. The authentication of the requesting resource occurs within a first processing environment that handles and monitors first resources for the first stage of the project.

According to an embodiment, at 211, the project-access control service dynamically and automatically initiates the authentication processing in response to the requesting resource that is detected as attempting to transition from another stage of the project into the first stage. So, when a requesting resource attempts to transition from one stage, such as development, to the first stage, such as testing, the project-access control service detects this attempted transition and automatically initiates authentication processing.

In some case, at 212, the project-access control service performs the authentication even when the requesting resource has authenticated before for other security systems or services. In other words, the requesting resource may be authenticated to the first processing environment but not authenticated separate for the security being enforced and associated with the first stage; in such a case, the project-access control service performs another layer of authentication against the requesting resource because the authentication associated with the requesting resource is being done for security that is being enforced for the first stage and is stage specific.

At 220, the project-access control service acquires access control rights for the requesting resource in response to an authenticated identity associated with the requesting resource. That is, the identity that the requesting resource is associated with when the requesting identity is authenticated is used to acquire and identify the access control rights that will be enforced against the requesting resource during its activity within the first stage.

In an embodiment, at 221, the project-access control service acquires the access control rights as metadata from the first stage, the project, and/or the first resources. In fact, the access control rights can be assembled from different metadata associated with each of the first stage, the project, and the first resources. Alternatively, any combination can be used or a single one can be used to acquire all of the access control rights being enforced against the identity associated with the requesting resource.

In another case, at 222, the project-access control service can acquire some of the access control rights in response to an active role that the identity of the requesting resource is associated with. So, the identity of the requesting resource may be associated with an administrator, a developer, etc. This role assigned to the identity may be used to acquire all or some of the access control rights that are to be enforced against the requesting resource within the first stage.

At 230, the project-access control service uses other services to continue to enforce any existing security restrictions associated with the first resources. So, existing security associated with the first resources is still enforced unabated, unless, at 231, policy or an access control right specifically overrides a particular existing security restriction.

According to an embodiment, at 240, the project-access control service during enforcement of the access control rights selectively presents some of the first resources while others are not presented for viewing of the requesting resource. Additionally, the access control rights may make only certain attributes or operations of a particular first resource viewable to the requesting resource. This fine-grain security is in addition to the existing security restrictions that are being enforced for the first resources. The access control rights are first-stage specific and customized based on the first stage and the identity of the authenticated requesting resource.

In another case, at 250, the project-access control service permits the requesting resource to define other access control rights for the first stage and the first resources for other subsequent requesting resources that transition to the first stage. In other words, policy may permit the requesting resource to define access control rights for other requesting resources as they transition to the first stage and to the first resources of the first stage.

Figure 3:
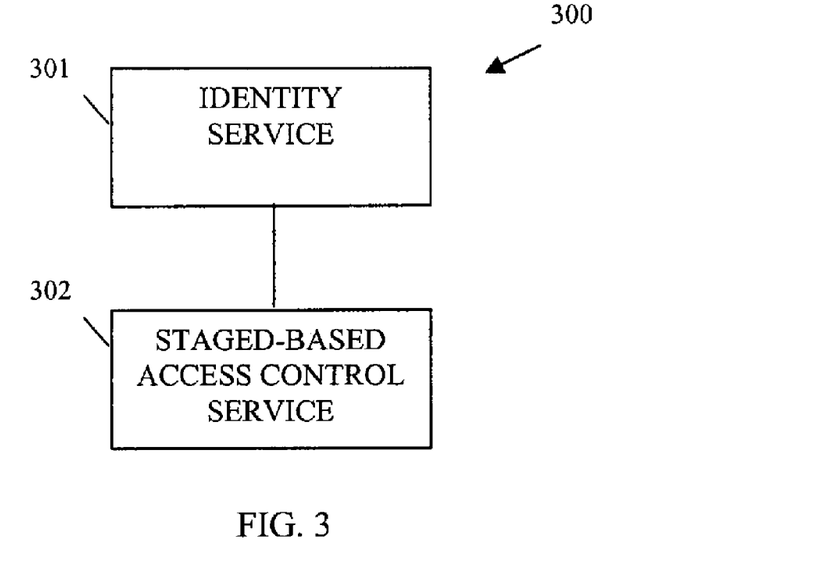
FIG. 3 is a diagram of a staged-based access control system, according to an example embodiment.

FIG. 3 is a diagram of a staged-based access control system 300, according to an example embodiment. The staged-based access control system 300 is implemented as instructions on or within a machine-accessible and readable medium. The instructions when executed by a machine perform various aspects of the processing depicted with respect to the methods 100 and 200 of the FIGS. 1 and 2, respectively. The staged-based access control system 300 is also operational over a network and the network may be wired, wireless, or a combination of wired and wireless.

The staged-based access control system 300 includes an identity service 301 and a staged-based access control service 302. Each of these components and their interactions with one another will now be discussed in turn.

The identity service 301 is implemented in a machine-accessible and readable medium and is to process on a machine. Examples of identity services 301 were identified and incorporated by reference above.

The identity service 301 assist in authenticating requesting resources before access control rights are enforced against the requesting resources for a particular stage of a project lifecycle. In some cases, the identity service may also be used to distribute the access control rights and policies that define the access control rights. The requesting resources once authenticated via the identity service are identified with particular access control rights for a particular stage of the project lifecycle.

The identity service 301 may be used as a trusted intermediary that the staged-based access control service interacts with for purposes of authenticating requesting resources to a particular stage and a particular processing environment and, as stated above, may also be used to identify, distribute, and manage access control rights and policies that define the access control rights.

The staged-based access control service 302 is implemented in a machine-accessible and readable medium and is also to process on the machine or a different machine that is not the machine that processes the identity service 301. Example processing and features associated with a staged-based access control service 302 were presented above with reference to the methods 100 and 200 of the FIGS. 1 and 2, respectively.

The staged-based access control service 302 enforces access control rights against requesting resources attempting to access target resources and within a context of a particular stage of a particular project.

In an embodiment, the staged-based access control service 302 interactively receives at least some definitions for the access control rights from an administrator of the particular stage or the particular project.

According to another embodiment, the staged-based access control service 302 acquires at least some of the access control rights in response to active roles assigned to the requesting resources.

The access control rights are enforced on top of existing security restrictions associated with a particular processing environment having the target resources and associated with a particular stage of the project lifecycle.

In an embodiment, at least one access control right overrides enforcement of at least one existing security restriction. So, the access control rights can override and supersede existing security restrictions.

Moreover, the access control rights are defined by policies acquired from one or more of the following: the identity service, metadata associated with the particular project, and metadata associated with the particular stage. In some cases, the access control rights are hierarchical, such that at least some higher-level access control rights automatically include other lower-level ones of the access control rights.

Figure 4:
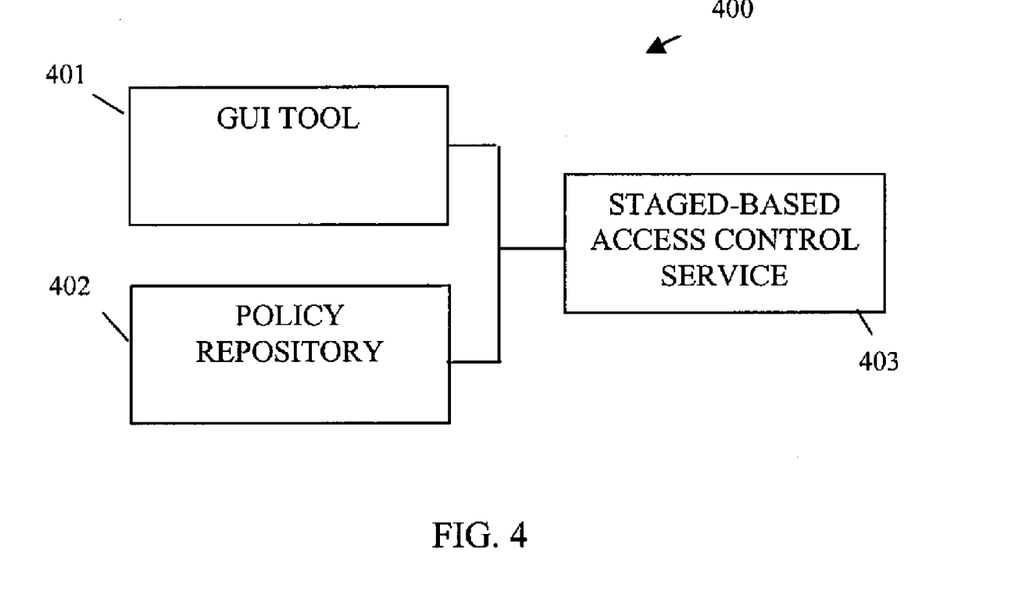
FIG. 4 is a diagram of another staged-based access control system, according to an example embodiment.

FIG. 4 is a diagram of another staged-based access control system 400, according to an example embodiment. The staged-based access control system 400 is implemented as instructions on or within a machine-accessible and readable medium. The instructions when executed by a machine perform various aspects of the processing depicted with respect to the methods 100 and 200 of the FIGS. 1 and 2, respectively, and processing associated with the system 300 of the FIG. 3. The staged-based access control system 400 is also operational over a network and the network may be wired, wireless, or a combination of wired and wireless.

The staged-based access control system 400 presents an alternative architecture and arrangement of components from that which was presented with the staged-based access control system 300 of the FIG. 3.

The staged-based access control system 400 includes a graphical user interface (GUI) tool 401 and a policy repository 402. In some cases, the staged-based access control system 400 may also include a staged-based access control service 403. Each of these components and their interactions with one another will now be discussed in turn.

The GUI tool 401 is implemented in a machine-accessible and readable medium and is to process on a machine. The GUI tool dynamically interacts with an administrative resource to define access control rights for a stage associated with a lifecycle of a project. The stage includes a variety of stage-specific resources. Furthermore, the access control rights are defined via policies for the stage and housed in the policy repository 402 and subsequently dynamically enforced against requesting resources that transition into the stage. Also, the policies also subsequently enforced on top of existing security limitations associated with a processing environment of the stage-specific resources.

In one case, the GUI 401 tool is used by the administrative resource to define custom authentication mechanisms for the requesting resources to successfully authenticate to the stage before the policies are acquired from the policy repository for enforcement. So, authentication techniques and processes may be defined in a custom manner for the requesting resources before the policies are known or acquired.

According to an embodiment, some policies are defined by the administrative resource to be conditionally triggered during enforcement in response to active roles assigned to the requesting resources.

In another case, some policies are defined by the administrative resource to be conditionally triggered during enforcement in response to one or more of the following situations: an identity associated with a particular one of the stage-specific resources, an identity associated with a particular one of the requesting resources, an identity associated with the stage, and an identity associated with the processing environment of the stage.

In still another situation, some policies restrict particular requesting resources from viewing particular stage-specific resources within the stage or some policies restrict the particular requesting resources from viewing attributes, operations, or settings associated with particular stage-specific resources.

The policy repository 402 is implemented in a machine-accessible and readable medium and is accessible to the GUI tool 401 that processes on the machine.

In an embodiment, the staged-based access control system 400 also includes a staged-based access control service 403. The staged-based access control service 403 is implemented in a machine-accessible and readable medium and is accessible to the one or more machines. Example processing associated with the staged-based access control service 403 was presented above in detail with reference to the methods 100 and 200 of the FIGS. 1 and 2, respectively, and with reference to the system 300 of the FIG. 3.

The staged-based access control service 403 subsequently and dynamically enforces the policies against requesting resources by acquiring the policies from the policy repository 401 and evaluating them when the requesting resources are successfully authenticated to the stage.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    acquiring access control rights for a first stage of a first processing environment, wherein the first stage is one of a plurality of other stages associated with a lifecycle of a project; and
    dynamically and in real time enforcing the access control rights against requesting resources that access the first processing environment in response to identities associated with the requesting resources and policies associated with the identities that map to portions of the access control rights, each access control right tied to one or more attributes of first resources in the first processing environment and each access control right tied to one or more of the policies, the access-control rights are specific to the first stage and the attributes to which the access-control rights are tied and the access control rights are customized based on the identities, and wherein the access control rights are additional security limitations layered on top of and in addition to existing security limitations for the first processing environment, the policies supersede the existing security limitations permitting the access control rights to override the existing security limitations, the policies tied to the identities for the requesting resources.

2. The method of claim 1, wherein acquiring further includes recognizing the access control rights as having some global access permissions applicable to the first processing environment, having some access permissions applicable to the first stage, and having some access permissions applicable to the project.

3. The method of claim 1, wherein acquiring further includes dynamically acquiring some of the access control rights in response to mappings supplied by an administrator that owns or is responsible for defining security for the first stage.

4. The method of claim 1, wherein enforcing further includes determining customized authentication mechanisms for each of the requesting resources from the policies.

5. The method of claim 1, wherein enforcing further includes restricting some of the requesting resources from viewing particular first stage resources in response to enforcement of the access control rights.

6. The method of claim 1, wherein enforcing further includes accepting in response to particular policy configuration information for a particular first stage resource from a particular requesting resource, and wherein the particular requesting resource is unable pursuant to the access control rights to view the particular first stage resource but is able to supply the configuration information pursuant to the particular policy.

7. A method, comprising:
  authenticating a requesting resource to a first stage of a project within a first processing environment, wherein the first stage includes a plurality of first resources;
  acquiring access control rights in response to an authenticated identity associated with the requesting resource, each access control right also associated with one or more attributes for the first resources in the first processing environment and each access control right tied to particular policies that include additional security restrictions, and each access control right is specific to the first stage and customized based on the authenticated identity of the requesting resource;
  enforcing existing security restrictions for the first resources, wherein the existing security restrictions are defined outside the context of the access control rights and are associated with the first processing environment; and
  selectively presenting to the requesting resource some of the first resources or some of the attributes or operations of the first resources in response to dynamically and in real time enforcing the access control rights, via the additional security restrictions, on top of the existing security restrictions, the access control rights override portions of the existing security restrictions with respect to the first resources or the operations of the first resources.

8. The method of claim 7, wherein authenticating further includes dynamically and automatically initiating the authentication processing in response to an attempt by the requesting resource to transition to the first stage from another stage associated with a lifecycle of the project.

9. The method of claim 7, wherein authenticating further includes performing the authentication in addition to other authentications of the requesting resource, wherein the authentication is associated with stage transitioning within a lifecycle of the project.

10. The method of claim 7, wherein acquiring further includes acquiring the access control rights as metadata associated one or more of the following: the project, the first stage, and the first resources.

11. The method of claim 7, wherein acquiring further includes acquiring some of the access control rights in response to a role assigned to the authenticated identity.

12. The method of claim 7, wherein enforcing further includes overriding some of the existing security restrictions with the access control rights in response to a particular one of the policies.

13. The method of claim 7 further comprising, permitting the requesting resource to define other access control rights for the first stage and for the first resources, wherein the other access control rights are defined by the requesting resource for other requesting resources that attempt to access the first stage of the project, and wherein a scope of defining the other access control rights is controlled by a particular one of the policies.

14. A system, comprising:
  an identity service implemented in a machine-accessible and readable medium and to process on a machine; and
  a staged-based access control service implemented in a machine-accessible and readable medium and to process on the machine or a different machine, wherein the staged-based access control service is to enforce access control rights against requesting resources attempting to access target resources and within a context of a particular stage of a particular project, each access control right also tied to one or more attributes of the target resources and each access control right tied to one or more policies, the access control rights are stage specific and customized based on identities of the requesting resources, the staged-based access control service interacts with the identity service to authenticate the requesting resources before dynamically and in real time enforcing the access control rights, via the one or more policies, and the access control rights are enforced on top of existing security restrictions associated with a particular processing environment having the target resources, the requesting resources are tied to identities that map via a particular policy to specific ones of the access control rights and the access control rights at least partial override, via the one or more policies, portions of the existing security restrictions for the particular processing environment.

15. The system of claim 14, wherein the access control rights are defined by the one or more policies acquired based on one or more of the following: the identity service, metadata associated with the particular project, and metadata associated with the particular stage.

16. The system of claim 14, wherein the access control rights are hierarchical, wherein at least some higher-level access control rights automatically include other lower-level ones of the access control rights.

17. The system of claim 16, wherein the staged-based access control service interactively receives at least some definitions for the access control rights from an administrator of the particular stage or the particular project.

18. The system of claim 14, wherein the staged-based access control service acquires at least some of the access control rights in response to active roles assigned to the requesting resources.

19. A system, comprising:
  a graphical user interface (GUI) tool implemented in a machine-accessible and readable medium and is accessible to one or more machines; and
  a policy repository implemented in a machine-accessible and readable medium and accessible to the GUI tool, wherein the GUI tool dynamically interacts with an administrative resource to define access control rights for a stage associated with a lifecycle of a project, wherein the stage includes a variety of stage-specific resources, and wherein the access control rights are defined via policies for specific attributes of the stage specific-resources of the stage and based on specific identities for requesting resources that access the stage and the policies are housed in the policy repository and subsequently dynamically and in real time enforced against the requesting resources that transition into the stage and the policies also subsequently enforced on top of existing security limitations associated with a processing environment of the stage-specific resources, the access control rights of the policies override conflicting portions of the existing security limitations within the processing environment of the stage and each access control right is tied to one or more of the policies and each access control right is specific to the stage and customized based on the specific identities for the requesting resources.

20. The system of claim 19 further comprising, a staged-based access control service implemented in a machine-accessible and readable medium and to process on the machine, wherein the staged-based access control service subsequently and dynamically enforces the policies against requesting resources by acquiring the policies from the policy repository and evaluating them when the requesting resources are successfully authenticated to the stage.

21. The system of claim 19, wherein some policies are defined by the administrative resource to be conditionally triggered during enforcement in response to active roles assigned to the requesting resources.

22. The system of claim 19, wherein some policies are defined by the administrative resource to be conditionally triggered during enforcement in response to one or more of the following: an identity associated with a particular one of the stage-specific resources, an identity associated with a particular one of the requesting resources, an identity associated with the stage, and an identity associated with the processing environment of the stage.

23. The system of claim 19, wherein the GUI tool is used by the administrative resource to define custom authentication mechanisms for the requesting resources to successfully authenticate to the stage before the policies are acquired from the policy repository for enforcement.

24. The system of claim 19, wherein some policies restrict particular requesting resources from viewing particular stage-specific resources within the stage or some policies restrict the particular requesting resources from viewing particular attributes, operations, or settings associated with particular stage-specific resources.

* * * * *